Nov. 30, 1937.  W. C. RUSSELL  2,100,569
THIMBLE FOR ROPE SLINGS
Filed Oct. 7, 1935  2 Sheets-Sheet 1

Inventor
William C. Russell
by Parker + Carter.
Attorneys

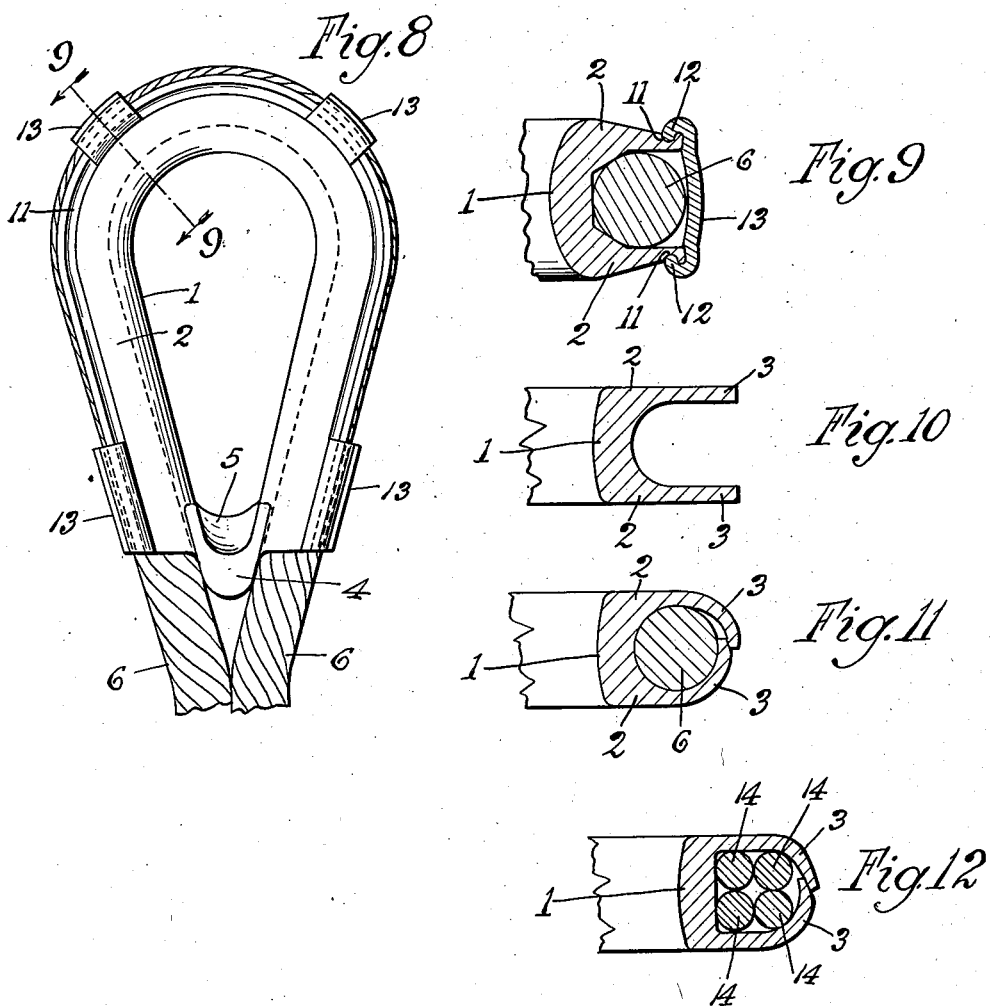

Patented Nov. 30, 1937

2,100,569

UNITED STATES PATENT OFFICE 2,100,569

THIMBLE FOR ROPE SLINGS

William C. Russell, Kenosha, Wis., assignor to Macwhyte Company, Kenosha, Wis., a corporation of Wisconsin Application October 7, 1935, Serial No. 43,847

2 Claims. (Cl. 114—115)

This invention relates to a thimble and to the combination of a thimble with a rope.

In one form the invention comprises a thimble and a rope shaped in an eye about the thimble. The rope may be shaped and fastened into the form of an eye in any desired manner.

An object of the invention is to provide a thimble which may be readily combined with a rope and securely fastened to a rope eye without the necessity of heating.

Heretofore thimbles have been formed and wire rope eyes have been formed about them. Thereafter, in order to secure the thimble to the eye or to the rope, it has been necessary to weld, braze or forge the thimble in some manner by the application of heat. While this is effective in forming the thimble or in shaping or reforming it to engage the rope, the use of heat in this connection is damaging to the wire rope. Wire ropes are always made of properly tempered material and the use of heat in shaping and attaching the thimble destroys or reduces the temper of the rope. It is an object of the invention, therefore, to provide a thimble and to combine that thimble with a rope in such manner that heat is unnecessary so that an adequate attachment of the thimble to the rope is accomplished.

While reference is made herein to the combination of the thimble with a rope, it is to be understood that the invention is not limited to any particular form of rope and the thimble may be combined with a rope, with the eye of a rope, with a loop or sling, and it is therefore an object of the invention to provide a thimble and to combine that thimble with some form of rope in such manner that the final positive attachment of the two together can be accomplished without heating the thimble.

Other objects will appear from time to time in the specification and claims.

The invention is more or less diagrammatically illustrated in the accompanying drawings, wherein:—

Figure 8 illustrates a somewhat modified form of thimble;

Figure 9 is a transverse sectional detail taken at line 9—9 of Figure 8;

Figure 10 is a section generally similar to Figure 3 but showing a modified form of groove;

Figure 11 is a section showing the form of Figure 10 after it has been bent to engage a rope;

Figure 12 is a section generally similar to Figure 5, showing a multiple part rope in position.

Like parts are indicated by like characters throughout the specification and drawings.

In the forms shown in the first five figures, I designates generally the body of the thimble. The thimble is provided with flanges 2 and at suitable points, preferably adjacent its top and bottom, it is further provided with lugs 3 which extend outwardly beyond the flanges. The bottom of the thimble is closed at 4 and may be provided with a reduced, inwardly extending portion 5.

Figure 1:
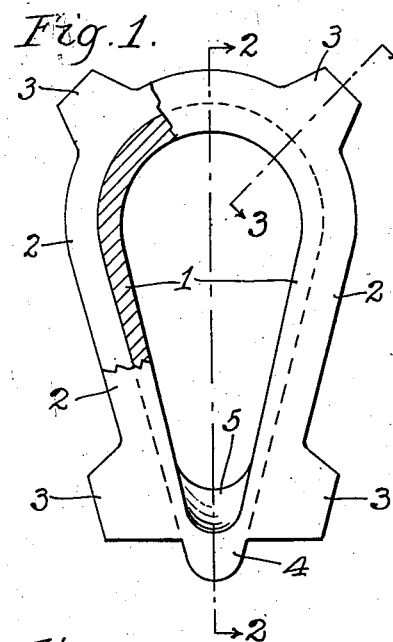
Figure 1 is an elevation with parts broken away and parts in section, showing one form of the thimble.
Figure 2:
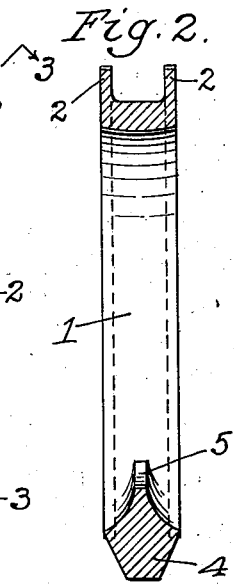
Figure 2 is a longitudinal section taken at line 2—2 of Figure 1.
Figure 4:
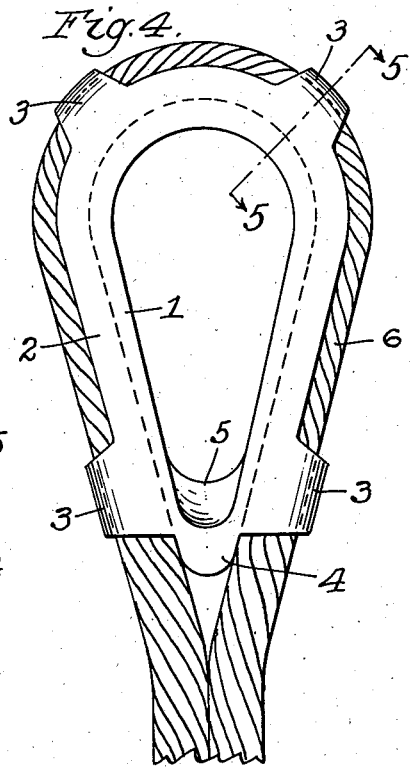
Figure 4 is an elevation of the completed article including the lug and the rope with the lugs moved into engaging position.
Figure 5:
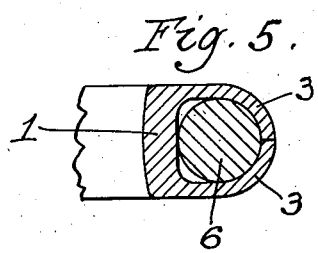
Figure 5 is a transverse section taken at line 5—5 of Figure 4 and showing the lugs in position engaging the rope.

6 is a rope positioned about the thimble and in the finished article the lugs 3 are bent as shown in Figures 4 and 5 about the rope to engage and hold it permanently to the thimble.

The ends of the rope may or may not be fastened together and if fastened together they may be spliced or otherwise secured.

Figure 6:
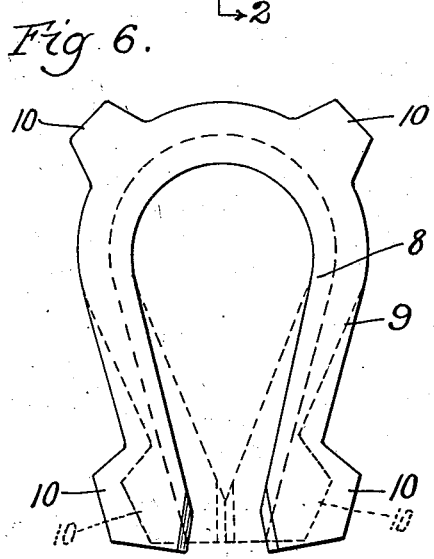
Figure 6 is an elevation generally similar to Figure 1 showing a modified form in which the thimble is open.
Figure 7:
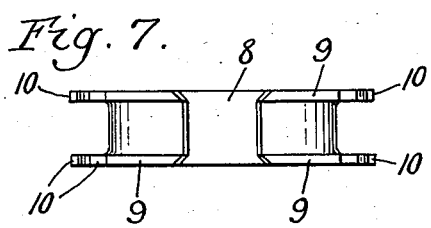
Figure 7 is an elevation of Figure 6.

In the form shown in Figures 6 and 7 the thimble is generally the same as that shown in the earlier figures except that it is provided with an open end so that it may be slipped over a ring, eye or other solid fitting, such as a weldless hook or closed socket. After the thimble has been fitted over such a fitting it may be bent as indicated along the dotted lines of Figure 6 so that its lower end or point is closed, and when so closed it may be welded at the point, but welding, if done, will be completed before the wire rope is placed about the thimble.

The thimble of Figures 6 and 7 comprises a body 8 having flanges 9 and lugs 10. A rope is laid about the thimble in the same manner illustrated in Figures 4 and 5 and the lugs are bent about the rope as illustrated in those figures to engage it tightly.

Thus in both forms of the invention the rope is secured to the thimble and the rope and thimble thus become in effect a unit without the necessity of the application of heat and without welding, brazing or forging of the thimble which would, by reason of the heat necessary, affect the wire rope detrimentally, and this formation of the rope and thimble together as a unit is not limited to any particular means for fastening the rope ends together to make the eye about the thimble nor in fact is it limited to fastening of the ends together at all. For some purposes it is advantageous to make a rope eye in which the ends are not fastened together in any manner but in which the rope is merely positioned about the thimble.

While the form of thimble illustrated in Figure 8 is generally the same as that shown in the other figures, it differs in a number of details, mainly in that instead of having integral members 3, which are bent over the rope after it is in place about the thimble, these are omitted. Instead the sides 2 of the thimble 1 are grooved as at 11 to receive the inturned edges 12 of clips or cover plates 13. These cover plates may be of different sizes or may all be of the same size. They are slipped in place engaging the grooves 11 after the rope has been put in place about the sling and if desired they may be spot welded after assembly. They may be otherwise secured in place by being riveted or otherwise deformed so that they retain their position in the grooves and are not thereafter displaced.

As shown the grooves 11 are on the outside of the sides 2 of the thimble 1. They might, however, be on the inside of these sides and then the engaging edges 12 or similar co-operating parts would be formed to engage with the grooves 11. The invention is thus not limited to the specific positioning of the grooves 12 nor to the specific form of the members on the cover plates or clips which engage with those grooves.

Figure 3:
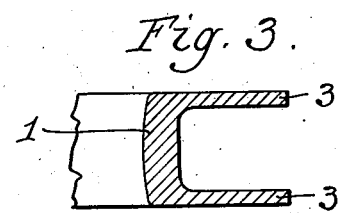
Figure 3 is a transverse sectional detail taken on an enlarged scale at line 3—3 of Figure 1, showing the attaching lugs in extended position.

Figure 10 is generally similar to Figure 3, except that it shows the groove formed in the clip between the sides 2 as having a bottom curved to conform to the shape of a rope which is to lie within it. It is primarily suitable for a single rope since it is rounded to conform to its shape.

Figure 11 shows the tongues 3 bent into shape to engage a rope. It will be noticed that in Figure 11 the tongues overlap slightly while in Figure 5, which shows a similar construction, they do not. Either arrangement may be used in the several forms of the device and the tongues may be bent over each other or may be given any other position in which they adequately engage the rope and prevent its separation from or displacement with respect to the thimble.

Figure 12 shows a form of the device substantially that shown in Figure 3 but in which a multiple part rope 14 is used. This type of rope may be conveniently used with a thimble having a relatively flat bottomed groove in its exterior and as shown in Figure 12 the members 3 overlap slightly.

While the several forms of the thimble are shown of such size as to receive one rope it is obvious that more than one rope might be positioned about the thimble. For example, two ropes might lie side by side in place of the single rope 6 shown in Figure 5. If more than one rope is to be positioned about the thimble obviously the size of the thimble will be made suitable to receive the desired rope or ropes. The thimble may receive a rope eye or merely any other section or part of rope.

It will be realized that whereas I have herewith shown and described a practical operative device, nevertheless many changes might be made in the size, shape, number and disposition of parts without departing from the spirit of the invention and I wish therefore that my showing be taken as in a sense diagrammatic.

I claim:

1. As an article of manufacture, a rope thimble comprising a rigid thimble body, outwardly directed rigid flanges formed integrally therewith, and a plurality of outwardly directed, flexible lugs formed integrally with said flanges, said lugs adapted to be bent over a rope which is to lie within the space bounded by said flanges, said thimble shaped with sides converging toward one end of the thimble, there being a section integrally joining said sides, adjacent the narrower end of said thimble, said section provided on its outer face with an outwardly directed projection rounded in the plane of the thimble as a whole.

2. As an article of manufacture, a rope thimble comprising a rigid thimble shoe, outwardly directed rigid flanges formed integrally therewith, and a plurality of outwardly directed, flexible lugs formed integrally with said flanges, said lugs adapted to be bent over a rope which is to lie within the space bounded by said flanges, said thimble shaped with sides converging toward one end of the thimble, there being a section integrally joining said sides, adjacent the narrower end of said thimble, said section provided on its outward face with an outwardly directed projection, rounded in the plane of the thimble as a whole and on its inner edge with tapering converging portions.

WM. C. RUSSELL.